(12) United States Patent
Bruck et al.

(10) Patent No.: US 9,004,105 B2
(45) Date of Patent: Apr. 14, 2015

(54) VALVE DEVICE

(75) Inventors: Peter Bruck, Althornbach (DE);
Markus Bill, Heusweiler (DE); Frank Schulz, Blieskastel-Bierbach (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 228 days.

(21) Appl. No.: 13/261,367

(22) PCT Filed: Jan. 15, 2011

(86) PCT No.: PCT/EP2011/000159
§ 371 (c)(1),
(2), (4) Date: Jul. 17, 2012

(87) PCT Pub. No.: WO2011/088975
PCT Pub. Date: Jul. 28, 2011

(65) Prior Publication Data
US 2012/0292540 A1 Nov. 22, 2012

(30) Foreign Application Priority Data
Jan. 21, 2010 (DE) .......................... 10 2010 005 229

(51) Int. Cl.
*F16K 11/07* (2006.01)
*F16K 31/06* (2006.01)

(52) U.S. Cl.
CPC ......... *F16K 11/0716* (2013.01); *F16K 31/0613* (2013.01)

(58) Field of Classification Search
CPC ............ F16K 11/0716; F16K 31/1245; F16K 31/0613; F16K 31/426; F16K 31/0606; F15B 13/042; F15B 13/0431; F15B 13/043; F15B 13/0402

USPC ............ 137/625.68, 625.69, 625.67, 625.66, 137/625.6, 625.64
See application file for complete search history.

(56) References Cited

U.S. PATENT DOCUMENTS

| | | | | |
|---|---|---|---|---|
| 4,046,165 A | * | 9/1977 | Rose et al. | 137/624.27 |
| 4,245,671 A | * | 1/1981 | Kosugui | 137/625.64 |
| 4,319,609 A | * | 3/1982 | Debrus | 137/625.63 |
| 4,510,973 A | * | 4/1985 | Balaskas | 137/625.64 |
| 6,283,149 B1 | | 9/2001 | Hayashi et al. | |
| 8,245,729 B2 | * | 8/2012 | Zub | 137/625.66 |

FOREIGN PATENT DOCUMENTS

DE 2209 206 8/1973
DE 43 19 162 A1 12/1994
(Continued)

*Primary Examiner* — Craig Schneider
*Assistant Examiner* — Craig J Price
(74) *Attorney, Agent, or Firm* — Roylance, Abrams, Berdo & Goodman LLP

(57) ABSTRACT

A valve device includes a housing (2) and a valve piston (4) axially displaceable in a piston bore (3) of housing (2). First and second load connections (A, B) can alternately be connected to a pressure connection (P) and to tank connections (T1, T2) by moving the piston from an idle position by first and second solenoids (5, 6). First and second pilot control chambers (7, 9) pressurize first and second piston back sides (8, 10) of the valve piston (4). The pressure in the pilot control chambers (7, 9) is controlled by first and second pilot control pistons (12, 13) movable by the solenoids (5, 7). The pilot control chambers (7, 9) are connected via a connection (11) to the pressure connection (P). The pilot control pistons (12, 13) open or close connections (14) between the pilot control chambers (7, 9) and the tank connections (T1, T2).

12 Claims, 4 Drawing Sheets

(56) References Cited

FOREIGN PATENT DOCUMENTS

| | | |
|---|---|---|
| DE | 102 24 739 A1 | 8/2003 |
| DE | 60016510 D1 | 1/2005 |
| GB | 1 526 630 | 9/1978 |
| GB | 1 527 931 | 10/1978 |

* cited by examiner

VALVE DEVICE

FIELD OF THE INVENTION

The invention relates to a valve device comprising a valve housing and a valve piston arranged to be able to move axially in a piston bore of the valve housing. Via the valve piston, a first load connection and a second load connection can be alternately connected to a pressure connection and to a tank connection. The valve piston can be moved out of a centered, preferably middle rest position, for connecting the first load connection to a pressure connection and the second load connection to the tank connection in one direction and for reversed fluidic communication of the connections in an opposite direction.

BACKGROUND OF THE INVENTION

Generic valve devices are readily available on the market in a plurality of embodiments, for example, as multiport valves. In conjunction with an electromagnetic actuation, they are an important component of the proportional valve technology. This technology is essentially characterized in that an electrical input signal as voltage is converted into an electrical current with an electronic amplifier of the corresponding voltage level.

A proportional solenoid as an switching magnet generates the output quantities force or path proportionally to this electrical current. These quantities are used as the input signal for the valve device or the hydraulic valve and, proportionally thereto, signify a specific volumetric flow or a specific pressure. For the respective actuated load and for a working element that has been actuated with it on a machine, in addition to influencing the direction of movement, this arrangement leads to the possibility of continuously influencing the speed and force. At the same time, according to a corresponding time characteristic, for example, change of the volumetric flow over time, acceleration or deceleration can be continuously influenced. Depending on the function being emphasized, that is, the path function, the flow function, and/or the pressure function, proportional hydraulics are used in directional valves, flow control valves, or so-called pressure valves.

The technical advantages of proportional valve technology include controlled actuation transitions, continuous control of the setpoints, and the reduction of the hydraulic apparatus for certain control tasks. Furthermore, with proportional valves, prompt and exact sequences of motion are possible with simultaneously improved accuracy of the control processes.

In practice, the known valve device solutions also leave much to be desired in the field of proportional valve technology for many control tasks, as can arise in double-acting hydraulic working cylinders in which the triggering takes place for positioning tasks while avoiding mechanical coupling elements, especially with respect to the operational reliability of the overall system as well as prompt reaction.

DE 43 19 162 A1 discloses a generic valve device with two opposing solenoids connected to a valve housing, with fluid connection sites mounted in the valve housing in the form of at least one pump connection P, at least two user connections A, B, and at least two tank connections T1 and T2. A valve piston has radial projections that can each be assigned to one fluid connection site A, B, T1, T2 at a time in the valve housing and fluid-conducting paths between the projections. In a neutral position block, the path to the respective assignable user connection A, B is blocked or cleared in part or in full. With the cleared user connections A, B cleared, the respective pressure connection P is completely blocked by the assignable projection. The known solution relates to a hydraulic valve that can be used for actuating a hydraulic actuator in a roll stabilization system of a motor vehicle.

DE 600 16 510 T2 describes a piloted directional valve with position determination. A housing has a number of connections and a housing bore in which each connection discharges. A valve piston is movably guided to be able to move axially in the bore to change the flow paths between the connections. Complex controls control the valve piston, with the controls comprising a piston on each side of the valve piston and one or two pilot valves for setting the valve piston by controlling the pilot fluid acting on the piston. A magnet is attached to one side of the valve piston such that it can be moved in synchronous operation with the valve piston. The magnet is arranged such that it borders at least one side of the valve piston. By a magnetic sensor, the magnetic force of the magnet can be detected over the entire displacement path of the valve piston.

DE 102 24 739 A1 discloses a valve device in which a first pilot chamber pressurizes a first back side of the valve piston and a second pilot chamber pressurizes a second piston back side. The pressure in the pilot chambers can be controlled by a first and second pilot pistons that can be moved by a first and a second electromagnet, respectively.

SUMMARY OF THE INVENTION

An object of the invention is to provide an improved valve device that is mechanically simple in structure and still enables reliable operation even under difficult operating conditions.

This object is basically achieved according to the invention by a valve device having first and second pilot chambers connected to the pressure connection via a fluid-conducting connection and pilot pistons that clear or block one fluid-conducting connection at a time between the pilot chambers and the tank connection. Due to the continuous fluid-conducting connection between the pressure connection and the first and second pilot chambers, the pressure medium in the pilot chambers can be used directly as a control. According to the position setting of the pertinent pilot piston, the fluid-conducting connection is specified between the pertinent pilot chamber and the tank connection, and thus, the pressure in the pilot chamber, which setting is effected by the pertinent electromagnet. With a simple construction, an overall system is formed characterized by operational reliability and prompt reaction.

Any deleterious effect on the valve piston caused by forces of friction or flow can be compensated without control effort by an intensified outflow of the pressure medium from the pertinent pilot chamber. As a result, the valve piston continues to move in the direction of the desired position.

If the electrical current for the first electromagnet is lowered or turned off, the pilot piston moves, preferably, additionally prompted by an energy storage mechanism, in the direction of a blocking position of the fluid-conducting connection between the first pilot chamber and the tank connection. The pressure that builds up again in the first pilot chamber shifts the valve piston again in the direction of its rest position.

The valve piston can also be axially displaced in the opposite direction in the same described manner as described when the second electromagnet is energized. In this way, the second load connection can be connected to the pressure connection and the first load connection to the tank connection.

Continuously, a fluid-conducting connection is between the pressure connection and the first and second pilot chambers. The pressure medium in the pilot chambers can act directly on the respective back side of the valve piston. It may also be advisable to provide mechanical coupling elements between the respective pilot chamber and the pertinent back side of the valve piston.

To enable a compact construction of the valve device, the respective fluid-conducting connection can be arranged between the pressure connection and the pilot chambers in the valve piston itself or in the valve housing. In an arrangement of the pertinent fluid-conducting connection, an off-center longitudinal bore in the valve piston is recommended. In the valve housing, the fluid-conducting connection can alternatively be made in a longitudinal bore with radial distance to a longitudinal axis of the valve housing. On the respective ends or end regions of the longitudinal bore, branch ducts can be routed to the pertinent two pilot chambers. A fluid-conducting connection is then produced that transfers a continuous pressure of the pressure medium out of the pressure connection to the pilot chambers.

In the valve piston, preferably, a continuous fluid-conducting connection is routed from the pilot chambers to the tank connection. The pertinent fluid-conducting connection is controlled by one pilot piston at a time on the opposite ends or back sides of the assignable valve piston. Preferably, a seat valve is formed using one end of each pilot piston, which end is formed as a cone or tip.

The fluid-conducting connections have a small diameter that is overall suited to enabling the required positioning rates of the valve piston, triggered by the pressure difference in the two pilot chambers.

The valve piston is held in a neutral position by an energy storage mechanism acting with the same compressive force in addition to the same compressive force of the pressure medium in the pilot chambers on both back sides of the piston. In order not to tap the supply pressure directly from the pressure connection, the pressure connection and thus the fluid-conducting connections from the pressure connection to the pilot chambers can advantageously be connected at the same time by one load connection that represents the load side of the load via a shuttle valve. This arrangement permits operating the valve arrangements with the pressure medium pump turned off, solely by the load pressure on the consumer. When the pressure medium pump is turned on again, the shuttle valve blocks, and the pressure on the pressure connection is transferred directly from the pump to the two pilot chambers.

To route the available pressure that is the highest at the time either from the pressure connection or the two load connections in the load circuit to the pilot chambers as a pilot pressure, all three pertinent connections, specifically the pressure connection, first load connection, and second load connection, can be connected via one nonreturn valve at a time to a collecting line to the fluid-conducting connection to the pilot chambers.

To center the valve piston in a neutral middle rest position in the piston bore and to return the valve piston when it is deflected, in addition one energy storage mechanism at a time or especially one compression spring can be inserted into each pilot chamber. The spring can shorten the switching time for resetting the piston. Likewise, each pilot piston can be acted upon using an energy storage mechanism, preferably designed as a compression spring, for purposes of closing the fluid-conducting connection from the pertinent pilot chamber to the pertinent tank connection. Advantageously, each armature of an electromagnet can be acted on with a compression spring for purposes of moving the valve piston into a neutral position.

A symmetrical embodiment of the valve device, that is easy to fabricate, is produced by selecting a middle position of the pressure connection of the pressure medium pump with reference to the longitudinal axis of the valve housing. To both sides of the pressure connection, the first and second load connections and first and second tank connections are connected to the pressure connection with respectively preferably the same distance.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 3 is a schematic, side elevational view in section, not to scale, of a valve device according to a second exemplary embodiment of the invention.

DETAILED DESCRIPTION OF THE INVENTION

Figure 1:
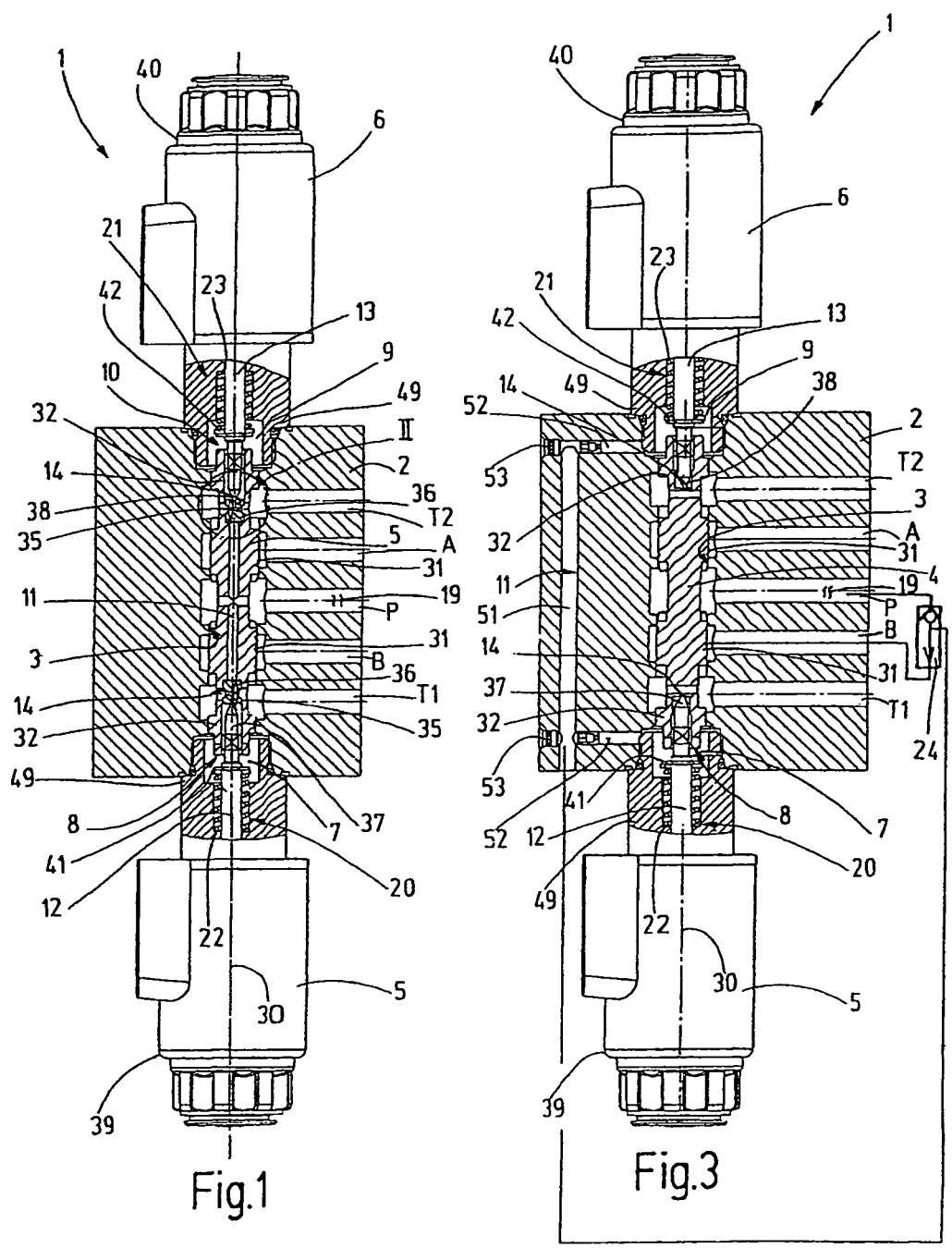
FIG. 1 is a schematic, side elevational view in section, not to scale, of a valve device according to a first exemplary embodiment of the invention.

FIG. 1, in a schematic longitudinal section that is not to scale, shows a valve device 1 for controlling pressure media, such as hydraulic oil, to a load (not shown). The valve device 1 has a valve housing 2 made essentially cylindrical. A through bore, designed as a piston bore 3 or cylinder for a valve piston 4, is made in the valve housing 2. For indirect actuation of the valve piston 4, on both sides of the valve housing 2, first and second electromagnets 5, 6 are separably mounted in one centering bore in the valve housing 2 in a manner that is not shown. The electromagnets 5, 6 are designed as proportional solenoids. In the valve housing 2, fluid connection sites are made in the form of at least one pump or pressure connection P, two load connections A, B, and two tank connections T1, T2. The valve piston 4 is guided to be able to move lengthwise in the valve housing 2 and has projections 31, 32 that are radial on the outer peripheral side. The respective radial outer periphery of the respective projection is chosen such that it can slide sealingly on the inner peripheral side of the piston bore 3.

In the exemplary embodiments of FIGS. 1 to 5, the two middle projections 31 are assigned to the load connections A, B, and the two projections 32 located axially on the ends of the valve piston 4 are assigned to the tank connections T1 and T2. Between the projections 31, 32, the valve piston 4 is reduced in diameter so that fluid-conducting paths are formed between the interior of the valve housing and the respectively reduced outside diameter of the valve piston 4.

On its two opposite sides or axial ends, the valve housing 2 has one first pilot chamber 7 and one second pilot chamber 9 at a time whose respective volume can be changed by the pilot piston 36, 37. The respective pilot chambers 7, 9 are connected to conduct fluid to the respective bores 33, 34 that are routed or extend axially from a first back side 8 and a second back side 10, respectively, of the valve piston 4.

The two pilot chambers 7, 9 are furthermore exposed to the control pressure or pump pressure with the pressure connection P via a fluid-conducting connection 11 made as a longitudinal bore in the valve piston 4. The fluid-conducting connection 11 in the valve piston 4 is continued to the pilot chambers 7, 9 in the valve piston 4 in an off-center bore 33, 34 of reduced diameter. The reduced-diameter bores are each made in a valve seat piece 35, 36 as shown in FIGS. 1, 2, 4, and 5. The valve seat pieces 35, 36 are sealingly fitted in the valve piston 4 in a respective widening of the bores. They can come to rest in the region of the tank connections T1, T2 in the rest positions of the valve piston 4.

One pilot piston 12, 13 at a time can be axially moved by the first and second electromagnets 5, 6 and comes to rest in a drain line 17, 18 located radially, each next to the bores 33, 34, in the valve seat pieces 35, 36 or the openings 15, 16 of the drain lines with a piston tip 37, 38. The drain lines 17, 18 in the valve seat pieces 35, 36 form fluid-conducting connections 14 from the pilot chambers 7, 9 to the respective tank connections T1, T2 for purposes of draining pressure medium 19. One compression spring 22, 23 at a time forms an energy storage mechanism 20, 21 for pressurizing the respective pilot piston 12, 13. The compression springs 22, 23 thus cause sealed pressing of the piston tips 37, 38 onto the openings 15, 16 and, moreover, a spring centering of the valve piston 4 under the influence of the equalizing compression forces of the compression springs 22, 23 in a rest position of the valve piston 4. The compression springs 22, 23 are supported on a housing 39, 40 of each electromagnet 5, 6 and on a stop collar 41, 42 of the respective pilot piston 12, 13.

Figure 4:
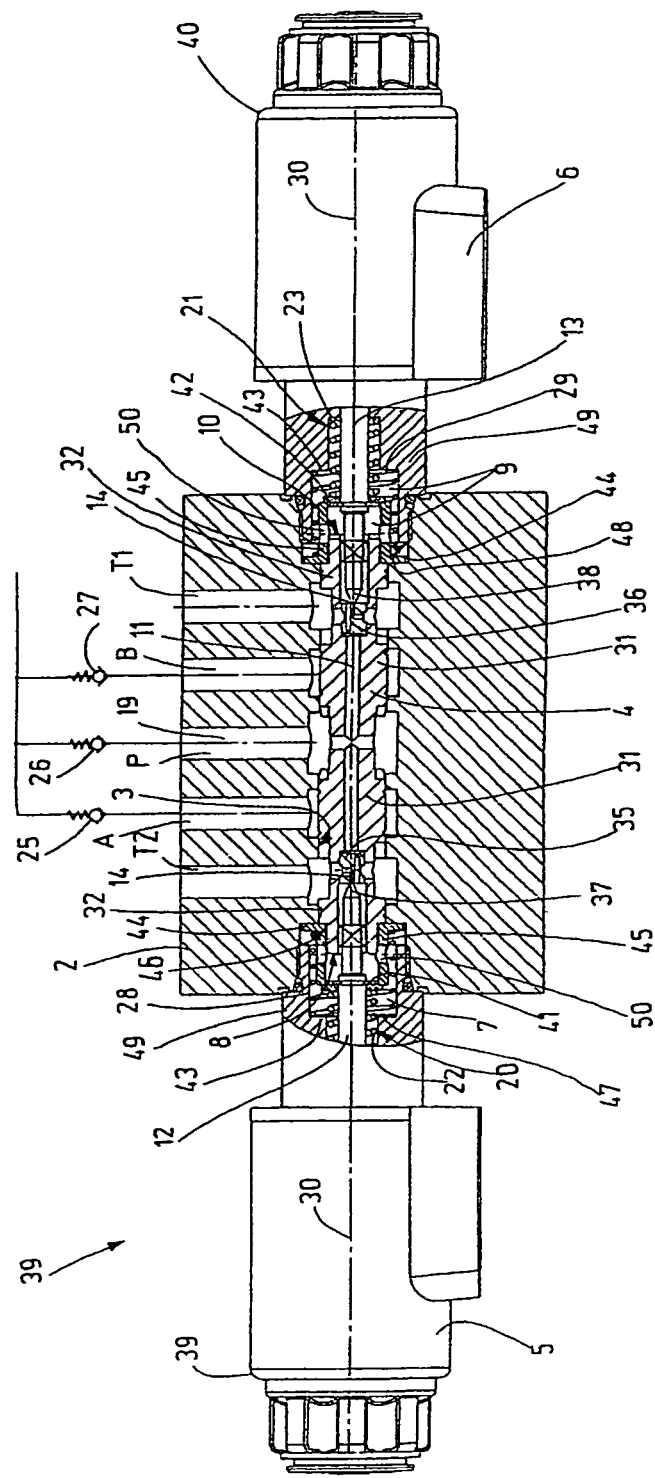
FIG. 4 is a schematic, side elevational view in section, not to scale, of a valve device according to a third exemplary embodiment of the invention.

As FIG. 4 furthermore shows, one spring 28, 29 at a time in each pilot chamber 7, 9 can be arranged loosely centered on its cylindrical inner peripheral surfaces. The springs 28, 29 in the pilot chambers 7, 9 are cylindrical compression springs, as are the other springs of the valve device 1. Those springs 28, 29 also have a considerably larger diameter than the compression springs 22, 23 that act on the respective pilot piston 12, 13 so that they radially encompass these compression springs 22, 23 and the respective pilot piston 12, 13. The springs 28, 29 in the pilot chambers 7, 9 are supported on a diameter offset 43 of the pilot chambers 7, 9, which offset is adjacent to the respective electromagnet 5, 6 that is assigned to the pilot piston 12, 13.

Figure 5:
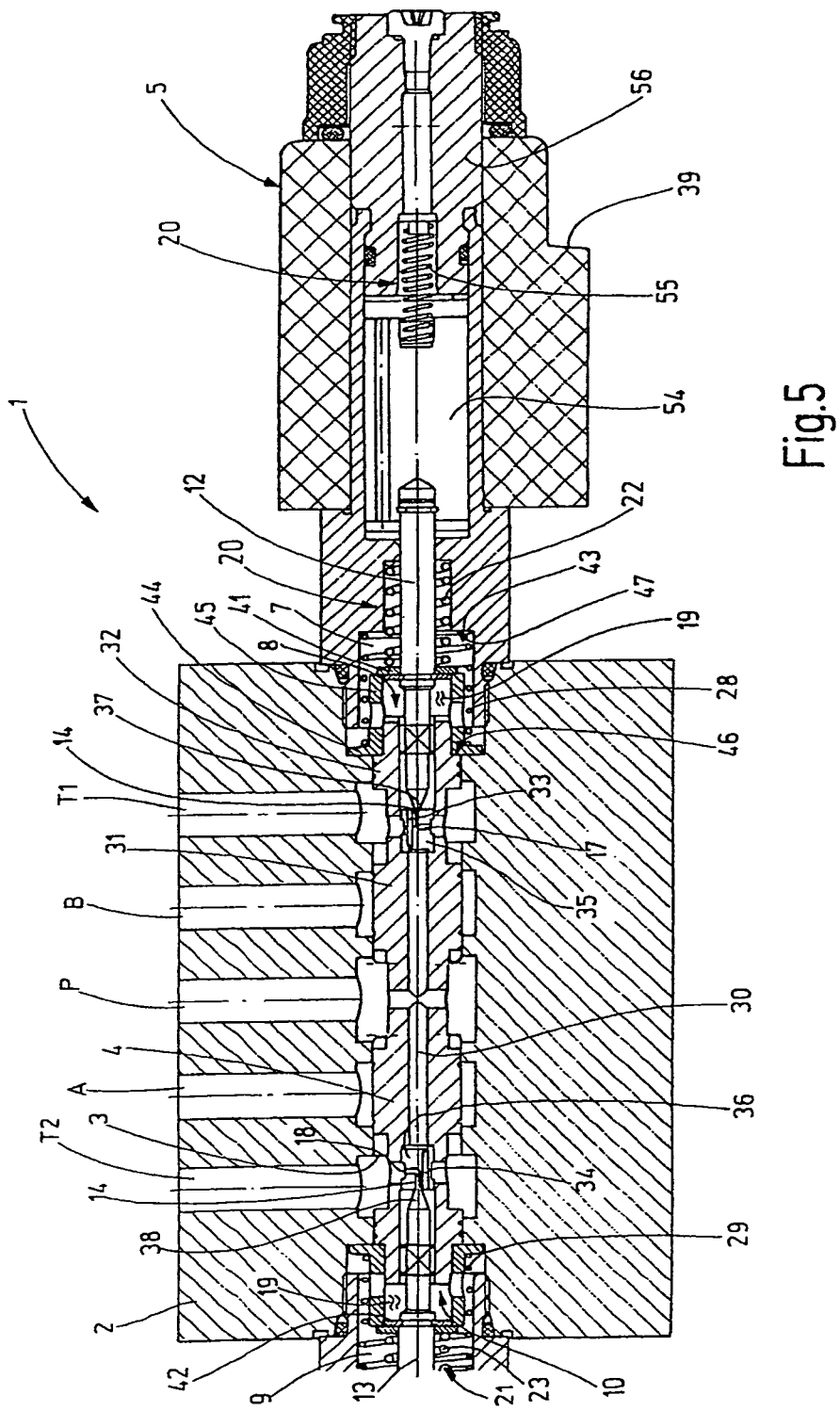
FIG. 5 is a schematic, side elevational view in section, not to scale, of a valve device according to a fourth exemplary embodiment of the invention.

On their other ends, the springs 28, 29 are each supported on a cylindrical sleeve 45 provided with a collar 44, with the cylindrical sleeve 45 extending through the springs 28, 29 with its outer peripheral surface. The respective collar 44 of a sleeve 45 strikes one face side 46 of a projection 32, which side faces the respective electromagnet 5, 6, on the valve piston 4 and strikes a pilot chamber bottom 47 formed by the valve housing 2. In this way, in the valve device 1 shown in FIG. 4, the valve piston 4 is moved axially into an exactly reproducible rest position. This valve piston is centered with the compression springs 22, 23 and 28, 29 and the respective pressure in the pilot chambers 7, 9. The respective collar 44 of the sleeve 45 can be moved axially within certain limits that are defined by a face surface 48 of a screw-in nipple 49 of the respective housing 39, 40 of the electromagnets 5, 6. The respective sleeve 45 has radial through holes 50 for pressure medium 19. As FIG. 5 shows, in the region of each electromagnet, further compression springs 55 can additionally cause centering of the valve piston 4 in its neutral position. The compression spring 55 in FIG. 5 is supported on one end of each armature 54 of the electromagnets 5, 6, which end is opposite the respective pilot piston 12, 13, and a pole core 56.

As the version of the valve device 1 in FIG. 3 shows, the fluid-conducting connection 11 between the pressure connection P and the pilot chambers 7, 9, which connection is designed as a bypass line that is continuously exposed to system or pump pressure, can also be implemented via a longitudinal bore 51 and branch ducts 52 that are routed by the bore perpendicular to the respective pilot chambers 7, 9 with corresponding filler plugs 53 in the valve housing 2. The longitudinal bore 51 lies radially spaced from the longitudinal axis 30 of the valve housing 2.

Figure 2:
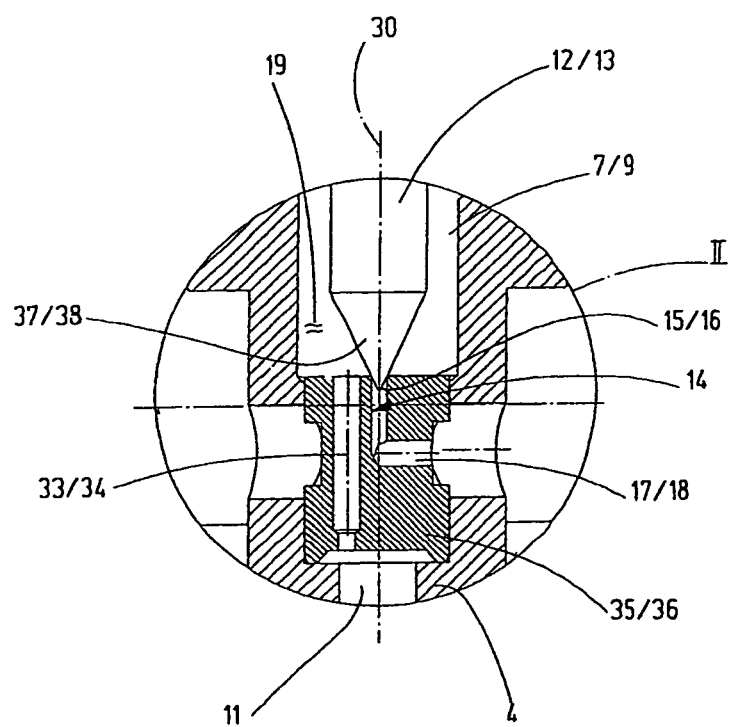
FIG. 2 is an enlarged, partial side elevational view in section of detail II in FIG. 1.

The operation of the valve device 1 according to the invention is detailed below using the exemplary embodiment in FIG. 1 and the detail II in FIG. 2. If the valve device 1 is in its neutral position, which position is shown in all the figures, the coil windings of the electromagnets 5, 6 are not energized. The valve piston 4 is kept in the middle position via compression springs (pole tube springs) 55 and/or via the two compression springs 22, 23 and the pilot piston 12, 13 that they act upon. The piston tips 37, 38 of the pilot pistons 12, 13 close the openings 15, 16 of the drain lines 17, 18. The pilot chambers 7, 9 are exposed to the pump pressure, the load connections A, B can be pressurized, and the tank connections T1, T2 are unpressurized. This valve position would then correspond to the unextended middle position of a hydraulic working cylinder as a connected load, by way of example.

If the first electromagnet 5 is supplied with an electrical current, the first pilot piston 12 and its piston tip 37 move in the direction of the first electromagnet 5. In this way, the opening 15 is cleared, and pilot fluid can flow from the first pilot chamber 7 to the tank connection T1. The pressure in the second pilot chamber 9 conversely remains at the pump pressure level so that the valve piston 4 is moved in the direction toward the first electromagnet 5 by the pressure imbalance that is established in the pilot chambers 7, 9. In this way, fluid-conducting connections in the valve housing 2 between the pressure connection P and the load connection A, as well as between the load connection B and the tank connection T2, are cleared. Any deleterious effects on the valve piston 4 caused by forces of friction and flow are equalized by virtue of the fact that the flow of pressure medium 19 or pilot fluid increases. As a result, the pressure in the first pilot chamber 8 then continues to drop and the imbalance of forces in the axial direction of the valve piston 4 increases to the left in the viewing direction of the drawings. If the power to the first electromagnet 5 is lowered or even cut off, the valve piston 4 returns to its initial position under the action of the springs 28. The same sequence of events takes place in the reverse order when the second electromagnet 6 is energized.

As FIG. 3 shows, the supply pressure for the two pilot chambers 7, 9 can be tapped not only from the pressure connection P, but also via a coupling of the load connections A, B and the pressure connection P, with the interposition of a shuttle valve 24 either by the pressure connection P or one of the load connections A, B, before the pressure medium is supplied to the pilot chambers 7, 9. Due to this design measure, the valve device 1 can be operated even with the pressure medium pump turned off.

As FIG. 4 shows advantageously, tapping the highest available pressure medium pressure can be accomplished by connecting the indicated connections P, A, B in parallel via one nonreturn valve 25, 26, 27 at a time, each of which opens respectively in the direction of the pilot chambers 7, 9 between the connections and the fluid-conducting connection 11. This piloted valve device 1 then does not require path sensors for the valve piston 4 or any analysis or control electronics. The valve device 1 thus has a simple structure and low fault susceptibility. When the current supply of the electromagnets 5, 6 is interrupted, the valve piston 4 automatically returns to its spring-centered middle initial position.

While various embodiments have been chosen to illustrate the invention, it will be understood by those skilled in the art that various changes and modifications can be made therein without departing from the scope of the invention as defined in the appended claims.

What is claimed is:

1. A valve device, comprising:
   a valve housing having a piston bore therein, first and second load connections, a pressure connection and first and second tank connections;
   a valve piston mounted to move axially in said piston bore out of a middle rest position to connect said first load connection to said pressure connection and said second load connection to said first tank connection in a first direction and to connect said second load connection to said pressure connection and said first load connection to said second tank connection in a second direction opposite the first direction;
   first and second electromagnets coupled to said valve housing and acting on said valve piston to move said valve piston axially in said piston bore;
   a first pilot chamber in said valve housing pressurizing a first back side of said valve piston;
   a second pilot chamber in said valve housing pressurizing a second back side of said valve piston, said first and second pilot chambers being connected to said pressure connection via a fluid-conducting connection; and
   first and second pilot pistons controlling pressure in said first and second pilot chambers, respectively, and being movable by said first and second electromagnets, respectively, each said pilot piston clearing or blocking a respective opening of a respective drain line in said valve piston respectively connecting the respective pilot chamber to the respective tank connection to control flow of pressure media from said pilot chambers to said tank connections.

2. A valve device according to claim 1 wherein said fluid-conducting connection extends between said pressure connection and said pilot chamber in said valve piston.

3. A valve device according to claim 1 wherein said fluid-conducting connection extends between said pressure connection and said pilot chamber in said valve housing.

4. A valve device according to claim 1 wherein an energy storage mechanism maintains said valve piston in the middle rest position when said electromagnets are de-energized.

5. A valve device according to claim 4 wherein said energy storage device comprises compression springs.

6. A valve device according to claim 3 wherein said fluid-conducting connection comprises a shuttle valve connected to said pressure connection and to one of said load connections.

7. A valve device according to claim 1 wherein said fluid-conducting connection to said pilot chambers comprises said pressure connection and said first and second load connections coupled via first, second and third nonreturn valves, respectively, to said pilot chambers.

8. A valve device according to claim 1 wherein first and second springs in said first and second valve chambers, respectively, act on said valve piston for system pressure.

9. A valve device according to claim 1 wherein one compression spring acts on an armature in each said electromagnet to maintain said valve piston in the middle rest position.

10. A valve device according to claim 1 wherein first and second energy storage devices act on said first and second pilot pistons, respectively, biasing said first and second pilot pistons into positions closing said drain lines.

11. A valve device according to claim 1 wherein said pressure connection is between said first and second load connections in a direction of a longitudinal axis of said valve housing.

12. A valve device according to claim 11 wherein said first and second load connections are located between said first and second tank connections in the direction of the longitudinal axis of the valve housing.

* * * * *